(12) United States Patent
Chang (10) Patent No.: US 8,021,160 B2
(45) Date of Patent: Sep. 20, 2011

(54) LEARNING ASSESSMENT METHOD AND DEVICE USING A VIRTUAL TUTOR

(75) Inventor: Yao-Jen Chang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 762 days.

(21) Appl. No.: 11/539,178

(22) Filed: Oct. 6, 2006

(65) Prior Publication Data

US 2008/0020363 A1  Jan. 24, 2008

(51) Int. Cl.
  *G09B 23/28* (2006.01)

(52) U.S. Cl. ........ 434/262; 434/247; 434/252; 434/258; 434/308; 434/350; 345/429; 345/473; 345/619; 345/629; 345/630; 345/646; 382/107; 382/108; 473/222; 473/266

(58) Field of Classification Search ............. 434/308, 434/262, 350, 247, 252, 258; 345/429, 473, 345/619, 629, 630, 646; 382/107, 108; 473/222, 473/266
See application file for complete search history.

(56) References Cited

U.S. PATENT DOCUMENTS

| | | | | |
|---|---|---|---|---|
| 5,795,296 A * | 8/1998 | Pathak et al. | | 600/443 |
| 5,904,484 A * | 5/1999 | Burns | | 434/252 |
| 5,984,684 A * | 11/1999 | Brostedt et al. | | 434/252 |
| 6,272,231 B1 * | 8/2001 | Maurer et al. | | 382/103 |
| 6,330,281 B1 * | 12/2001 | Mann et al. | | 375/240.12 |
| 6,539,354 B1 * | 3/2003 | Sutton et al. | | 704/260 |
| 6,749,432 B2 * | 6/2004 | French et al. | | 434/247 |
| 6,807,535 B2 | 10/2004 | Goodkovsky | | 706/3 |
| 6,939,138 B2 * | 9/2005 | Chosack et al. | | 434/262 |
| 7,074,168 B1 * | 7/2006 | Farnes et al. | | 482/148 |
| 7,095,388 B2 * | 8/2006 | Truxa et al. | | 345/7 |
| 7,097,459 B2 * | 8/2006 | Ueda et al. | | 434/252 |
| 7,168,953 B1 * | 1/2007 | Poggio et al. | | 434/185 |
| 7,264,554 B2 * | 9/2007 | Bentley | | 473/222 |
| 2002/0158873 A1 * | 10/2002 | Williamson | | 345/427 |
| 2003/0031358 A1 * | 2/2003 | Truxa et al. | | 382/154 |
| 2003/0077556 A1 * | 4/2003 | French et al. | | 434/258 |
| 2004/0137415 A1 * | 7/2004 | DiMare et al. | | 434/252 |
| 2005/0170323 A1 * | 8/2005 | Jarrell et al. | | 434/262 |
| 2005/0196737 A1 * | 9/2005 | Mann | | 434/247 |
| 2005/0255434 A1 | 11/2005 | Lok et al. | | 434/262 |
| 2005/0272517 A1 * | 12/2005 | Funk et al. | | 473/222 |
| 2006/0045312 A1 | 3/2006 | Bernstein et al. | | 382/103 |

(Continued)

OTHER PUBLICATIONS

[BCS97] Bregler C., Covell M., Slaney M.: Video rewrite: Driving visual speech with audio. In *Proc. SIGGRAPH'97* (1997), pp. 353-360.

(Continued)

*Primary Examiner* — Xuan Thai
*Assistant Examiner* — Jack Yip (57) ABSTRACT

Disclosed is a learning assessment method and device using a virtual tutor. The device comprises at least one action acquisition module, a virtual tutor synthesis module, and a learning assessment module. The method captures and analyzes a first and a second action-feature for a first and a second targets respectively, and constructs an intrinsic model of the second target based on a reference data of the second target. A virtual tutor is synthesized by applying the first action-feature to the intrinsic model such that the virtual tutor exhibits the intrinsic characteristics of the second target but performs a synthesized action-feature similar to the first action-feature. The method then assesses the difference between the synthesized action-feature and the second action-feature.

11 Claims, 8 Drawing Sheets

U.S. PATENT DOCUMENTS

| | | | |
|---|---|---|---|
| 2006/0203096 A1* | 9/2006 | LaSalle et al. | 348/208.14 |
| 2006/0247070 A1* | 11/2006 | Funk et al. | 473/222 |
| 2007/0103471 A1* | 5/2007 | Yang et al. | 345/473 |
| 2007/0285419 A1* | 12/2007 | Givon | 345/420 |
| 2008/0037829 A1* | 2/2008 | Givon | 382/107 |

OTHER PUBLICATIONS

[BP95] Beymer D., Poggio T.: Face recognition from one example view. In *Proc. IEEE 5th International Conference on Computer Vision* (1995), pp. 500-507.

[CG00] Cosatto E., Graf H. P.: Photo-realistic talking-heads from image samples. *IEEE Trans. on Multimedia 2*, 3 (Sep. 2000), pp. 152-163.

[EGP02] Ezzat T., Geiger G., Poggio T.: Trainable videorealistic speech animation. In *Proc. SIGGRAPH '02* (2002), vol. 21, pp. 388-397.

[JP98] Jones M., Poggio T.: Multidimensional morphable models: a framework for representing and matching object classes. *International Journal of Computer Vision 29*, 2 (Aug. 1998), pp. 107-131.

[LW95] Leggetter C. J., Woodland P. C.: Maximum likelihood linear regression for speaker adaptation of continuous density hidden markov models. *Computer Speech and Language 9*, 2 (1995), pp. 171-185.

[SCA05] Chang Y. J., Ezzat T.: Transferable videorealistic speech animation. In *Proc. Symposium on Computer Animation 2005*, (2005), pp. 141-151.

Image-based Personalized virtual Coach ICL Technical Journal Jun. 25, 2006 Yao-Jen Chang p. 128-134.

\* cited by examiner

LEARNING ASSESSMENT METHOD AND DEVICE USING A VIRTUAL TUTOR

FIELD OF THE INVENTION

The present invention generally relates to a method and device of learning assessment using a virtual tutor.

BACKGROUND OF THE INVENTION

As the computer hardware and software technologies progress rapidly, the accumulated knowledge of human race is also stored digitally in a rapid manner, which is usually expressed as multimedia, such as text, audio, image, video, and so on. The development of wired and wireless network further eliminates the restriction of time and geographical location on the learning and knowledge delivery. The era of digital learning appears to have arrived. However, to promote the digital learning, it is important to facilitate the learning through natural interaction in addition to improve the technologies for knowledge categorization, lookup and reference mechanism. This is especially true for behavior learning.

According to the social learning theory of Professor Bandura of Stanford University, the individual learning process starts with the observation of a target model, memorization and storage for later mimicking. In other words, the learners learn the behavior through watching how the target model behaves. However, as it is difficult for the learners to distinguish the subtle differences between the observed behavior and the mimicking behavior, the learning effectiveness is usually poor if the observed model is not present to interact with the learners to give advice and assistance. Therefore, the present invention uses the action analysis and synthesis technologies to develop a virtual tutor mechanism to assist the learners in self-learning process.

Figure 1:
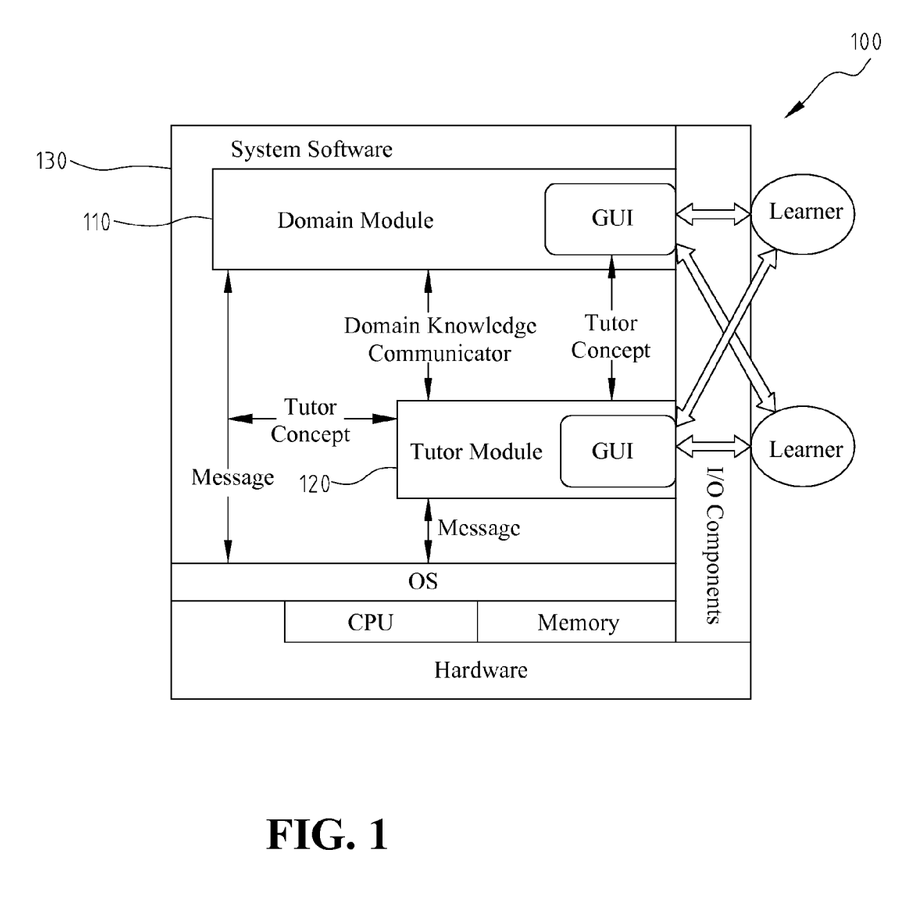
FIG. 1 shows a schematic view of a conventional intelligent teaching system.

U.S. Pat. No. 6,807,535 disclosed an intelligent tutoring system 100, including a domain module 110 and a tutor module 120, constructed on a platform 130 with processor and memory, as shown in FIG. 1. The tutor module uses fuzzy logic to dynamically select appropriate knowledge from domain module 110 to teach the learner in accordance with the learner's level of understanding. The main feature of the patent is on the selection of the appropriate knowledge.

Figure 2:
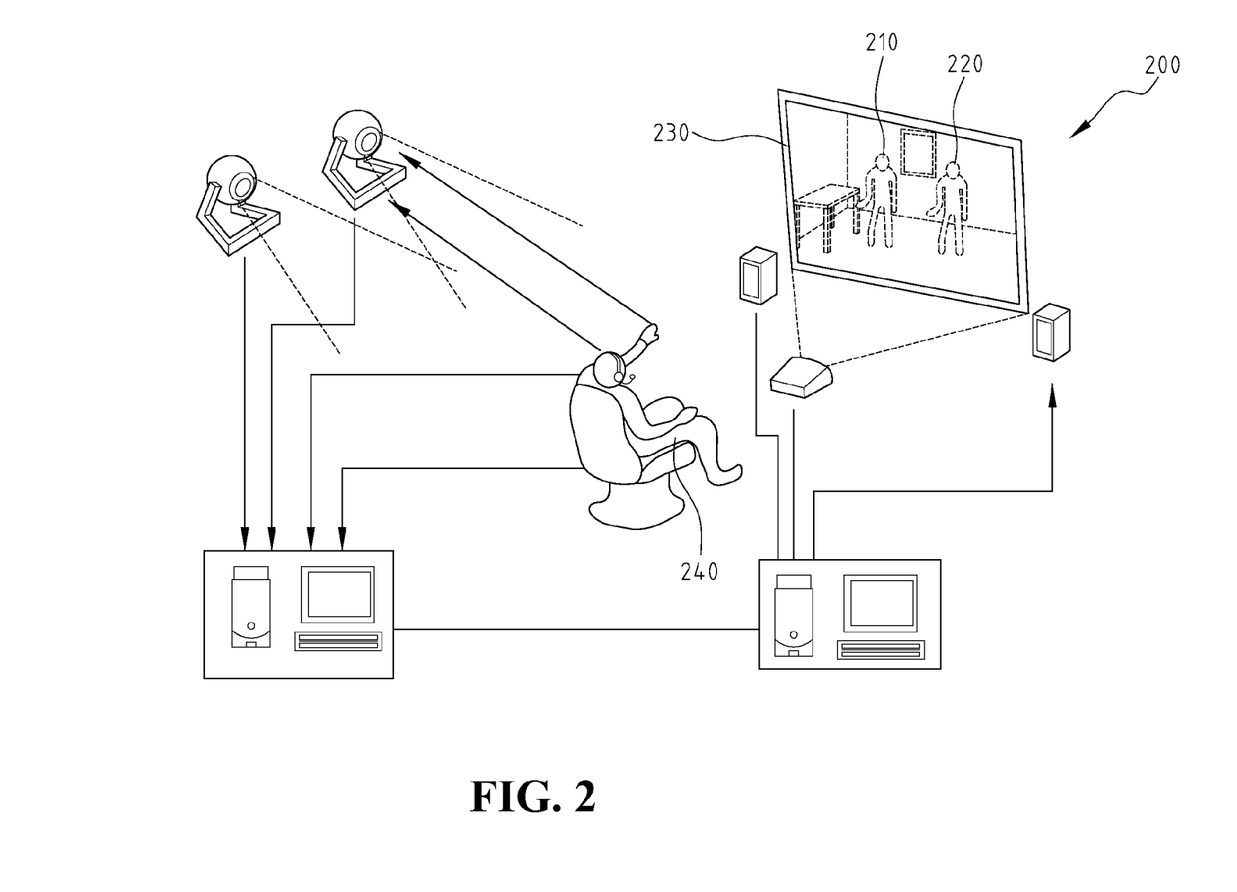
FIG. 2 shows a schematic view of a conventional interactive training system.

US. Publication No. 2005/0,255,434, Interactive Virtual Characters for Training including Medical Diagnosis Training, disclosed an interactive training system 200, as shown in FIG. 2. The system analyzes the user's behavior to find the user's intention, and then uses a computer-synthesized virtual character to respond accordingly. The system is applied in the medical training. The synthesized patient 210 and the tutor 220 can interact with the medical trainee 240 on the screen 230.

Figure 3:
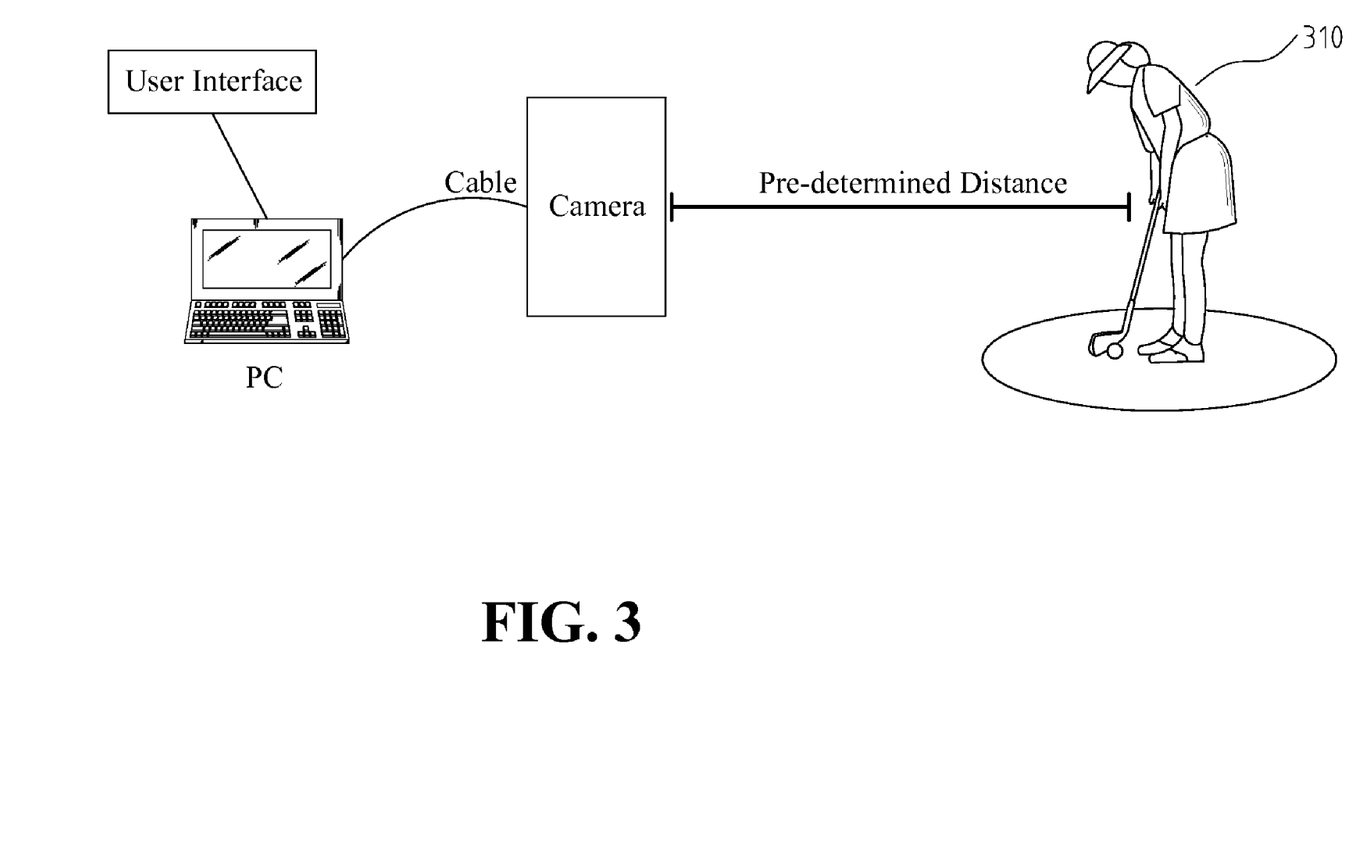
FIG. 3 shows a schematic view of a conventional device of providing the learner with the real-time image comparison feedback.

US. Publication No. 2006/0,045,312 disclosed an image comparison device for providing real-time feedback to the user. In the training stage, a sequence of behavior of the user 310 is recorded. In the test stage, another sequence of behavior of the user is recorded again. Through the comparison of the recorded image sequences, the device can find the discrepancy between the user's behavior in the training and the test stages.

Image-based videorealistic speech animation has drawn wide attention due to its supreme visual realism. This technique is originated from the video rewrite technique of C. Bregler. Triphone, a concatenation of three phonemes, is taken as the basic unit to collect the facial image during the target's speech. During the speech sequence synthesis, the image segments of the same triphone utterance are directly taken from the video corpus for concatenation.

AT&T also develops a similar technique using Viterbi dynamic programming algorithm to allow more flexibility in the length of the concatenating sequences for visual speech synthesis. These two approaches directly reuse the images in the pre-recorded video corpus without using any generative models for speech animation synthesis, resulted in two following problems. Firstly, the effectiveness of both approaches depends on the matched images found in the pre-recorded video corpus. Therefore, large amount of video corpus is required to ensure for the availability of any triphone-based phonetic combination in the novel sentence to be synthesized. Secondly, it is not possible to transfer the speaker to another person without recollection of a large video corpus. This poses large cost for the video recording and processing time, and the economical burden for the data space used.

Tony Ezzat et al. of MIT proposed a trainable videorealistic speech animation using the machine learning mechanism to construct the image-based videorealistic speech animation. Although this technique also requires collecting the facial video corpus of the specific person for training, only a small amount of learned model is kept for visual speech synthesis of novel sentences once the training is complete. The following describes the two core techniques, namely multidimensional morphable model (MMM) and trajectory analysis and synthesis.

MMM was proposed by M. Jones and T. Poggio of MIT in 1998, where the visual information of an image is represented by shape and texture components. The image analysis and recognition are done based on the composite coefficients of these two components. In the trainable videorealistic speech animation, however, MMM is used to parameterize the image for image synthesis application. Firstly, a set of prototype images is automatically selected from the video corpus by k-means algorithm. Then, each prototype is decomposed into a motion component represented by optical flow and a texture component. Each synthesized image can then be modeled as a linear combination of the motion and texture components of the selected prototype images.

More formally, when given a set of M prototype images $\{I_{P_i}\}_{i=1}^{M}$ and the prototype flow $\{C_{P_i}\}_{i=1}^{M}$, each novel synthesized image can be modeled as:

$$C^{syn} = \sum_{i=1}^{M} \alpha_i C_{P_i}, \quad (1)$$

$$I^{syn} = \sum_{i=1}^{M} \beta_i I_{P_i}^{warped} = \sum_{i=1}^{M} \beta_i W_F(I_{P_i}, W_F(C^{syn} - C_{P_i}, C_{P_i})), \quad (2)$$

where $C^{syn}$ and $I^{syn}$ are the motion and texture components of the novel image respectively, $W_F(p,q)$ is the forward-warp operation that warps vectors p according to flow vector q. Conversely, given a set of MMM parameter $\{\alpha_i, \beta_i\}_{i=1}^{M}$, a new mouth image can be synthesized by warping and blending the prototype images.

The goal of trajectory analysis and synthesis is to learn a phoneme model and use it to synthesize novel speech trajectories in the MMM parameter space. The characteristics of the MMM parameters for each phoneme are examined from corresponding image frames according to the audio alignment result. For simplicity, the MMM parameters for each phoneme are modeled as a multidimensional Gaussian distribution with mean vector $\mu_p$ and diagonal covariance matrix $\Sigma_p$. A trajectory of a novel speech sequence is derived by minimizing the following objective function:

$$E_s = (y-\mu)^T D^T \Sigma^{-1} D(y-\mu) + \lambda y^T W_k^T W_k y, \quad (3)$$

where the synthesized MMM parameter y is obtained by minimizing the distance to the cascaded target mean vector $\mu$ (weighted by the duration-weighting matrix D, and the inverse of the covariance matrix $\Sigma$), while also retaining the smoothness concatenation controlled by the k-th order difference matrix $W_k$.

However, the synthesized MMM parameters tend to be under-articulated when the mean and the covariance for each phoneme are directly calculated from the pooled MMM parameters for each phoneme. To resolve the problem, gradient descent learning is employed to refine the phoneme by iteratively minimizing the difference between the synthesized MMM trajectories y and the real MMM trajectories z. The error between the real and synthesized trajectories is defined by:

$$E_a = (z-y)^T (z-y) \quad (4)$$

and the phoneme model is refined by:

$$\mu_p^{new} = \mu_p^{old} - \eta \frac{\partial E_a}{\partial \mu_p}; \sum_p^{new} = \sum_p^{old} - \eta \frac{\partial E_a}{\partial \Sigma_p}, \quad (5)$$

where $\eta$ is a small learning rate parameter.

In summary, the trainable videorealistic speech animation requires two sets of parameters: a set of M prototype images and prototype flows to represent the texture and flow of the subject's mouth, and a set of phoneme models to model each phoneme in the MMM space using a Gaussian distribution for trajectory analysis and synthesis.

SUMMARY OF THE INVENTION

Examples of the present invention may provide a learning assessment method and device using a virtual tutor. The device includes at least an action acquisition and analysis module, a virtual tutor synthesis module, and a learning assessment module.

The present invention is auxiliary to user when self-learning through imitating the target model. On one hand, the action analysis technique is used to analyze and learn the target model's behavior. On the other hand, the action synthesis technique is used to synthesize the virtual tutor with the learner's appearance for learning assessment. The difference between the learner and the virtual tutor can help the learner to correct the deviation. The present invention also provides the clear presentation method and learning assessment to help the learner in the self-learning process.

The synthesized virtual tutor of the present invention is modeled after the learner. The virtual tutor imitates the target model's behavior for the learner to follow, and uses the learner's actual behavior to assess the learning result.

The learning assessment module of the present invention compares the difference between the learner's behavior and the virtual tutor's behavior so that the learner can correct the difference.

Accordingly, the method of learning assessment using virtual tutor of the present invention may include the following steps. The first step is to acquire and analyze a first action-feature of a first target. The second step is to input a reference data of a second target and establish an intrinsic model of the second target, and then using a synthesis mechanism to apply the first action-feature to said intrinsic model to form a virtual tutor, the virtual tutor having intrinsic characteristics of the second target but exhibiting an animated action similar to the first action-feature. The third step is to acquire and analyze a second action-feature of the second target. And, finally, the last step is to use a learning assessment module to assess the difference between said second action-feature and the animated action-feature of the virtual tutor.

The facial imitation is used as an example of the present invention. The present invention also uses the transferable videorealistic speech animation and mouth region motion learning for description.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 4:
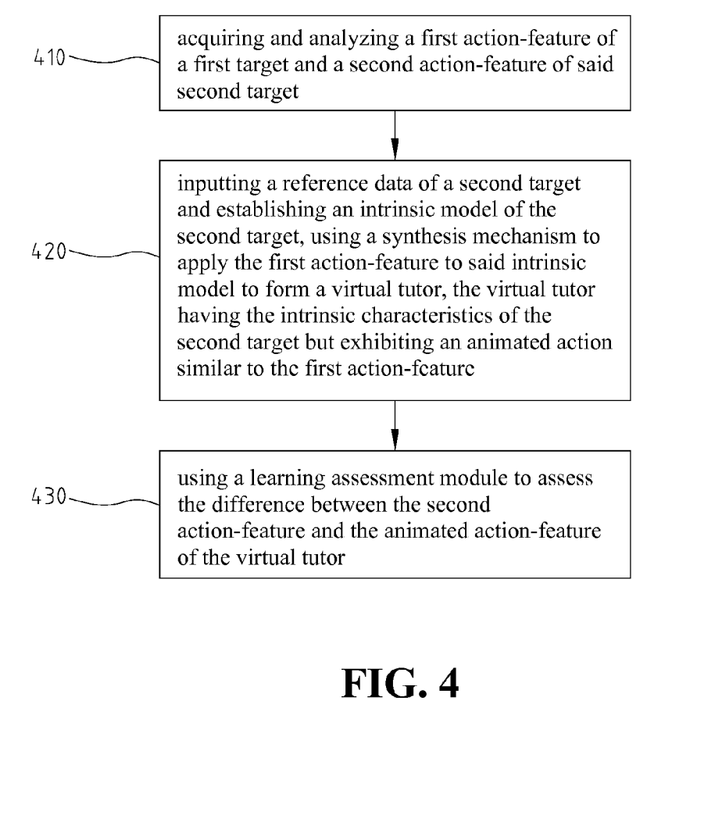
FIG. 4 shows an operating flow illustrating the learning assessment method using a virtual tutor according to the present invention.
Figure 5:
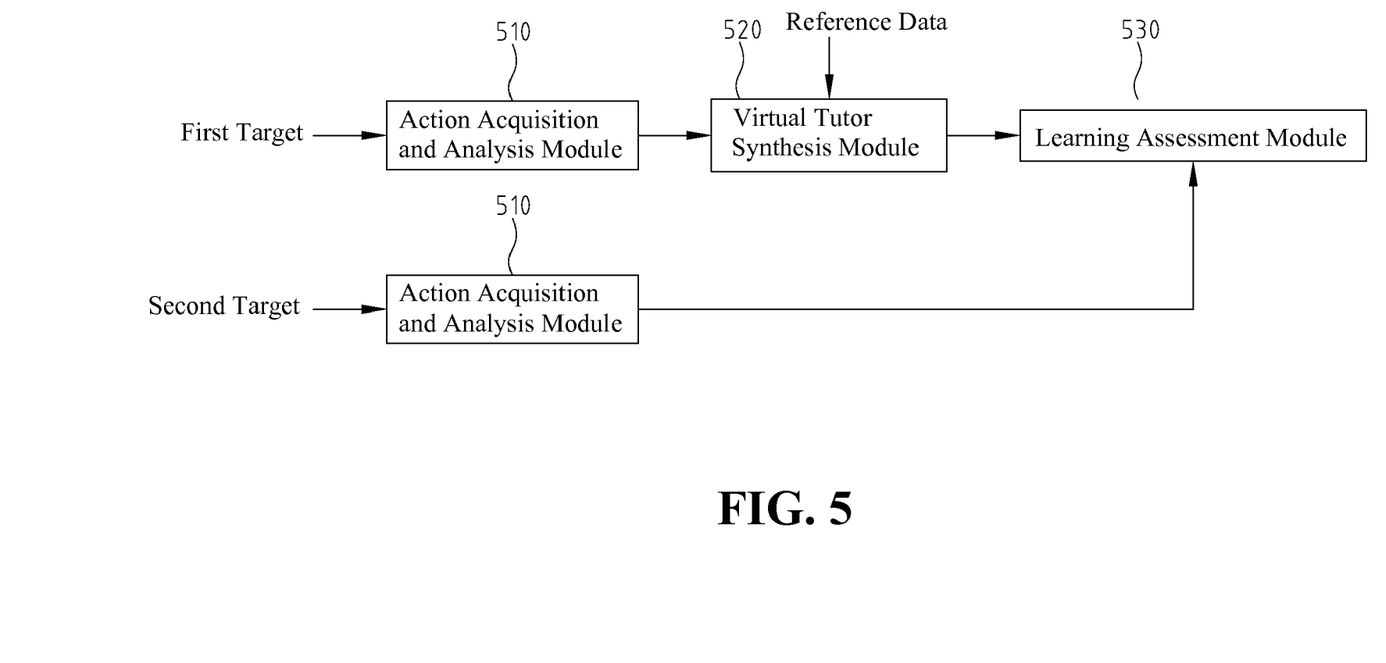
FIG. 5 shows a block diagram of the learning assessment device using a virtual tutor according to the present invention.

FIG. 4 shows a flowchart of the learning assessment method of the present invention, and FIG. 5 shows a block diagram of learning assessment device of the present invention.

As shown in FIG. 5, the learning assessment device includes an action acquisition and analysis module 510, a virtual tutor synthesis module 520 and a learning assessment module 530. The flowchart of the operation process is as shown in FIG. 4. Action acquisition and analysis module 510 captures and analyzes a first action-feature of a first target and a second action-feature of a second target, as shown in step 410. Virtual tutor synthesis module 520 establishes the intrinsic model for the second target based on the reference information of the second target, and then transforms and applies the first action-feature of the first target to the intrinsic model of the second target to synthesize a virtual tutor. The virtual tutor exhibits the intrinsic characteristics of the second target, and yet has the animated action-feature similar to the first action-feature of the first target, as shown in step 420. Finally, learning assessment module 530 compares the animated action-feature and the second action-feature for learning assessment or for correction guidance, as shown in step 430.

The first action-feature and the second action-feature can be acquired from an audio signal, a video signal or signals in a multimedia data format. For example, the action-feature of a target can be the body motion feature, facial motion feature, or voice feature of the target, or even other features extracted from physiological signals.

The present invention includes a first target and a second target. For example, the first target is the target being imitated and the second target is the learner. The learner intends to learn a certain behavior pattern or action from the imitated target. The behavior pattern or the action can be synthesized into a virtual tutor through a synthesis module. The virtual tutor uses the intrinsic characteristics (e.g. appearance) of the learner to exhibit the behavior or action of the imitated target for the learner to mimic. The behavior or action of the learner is either extracted by an action acquisition and analysis module, or synthesized by another synthesis module.

Figure 6:
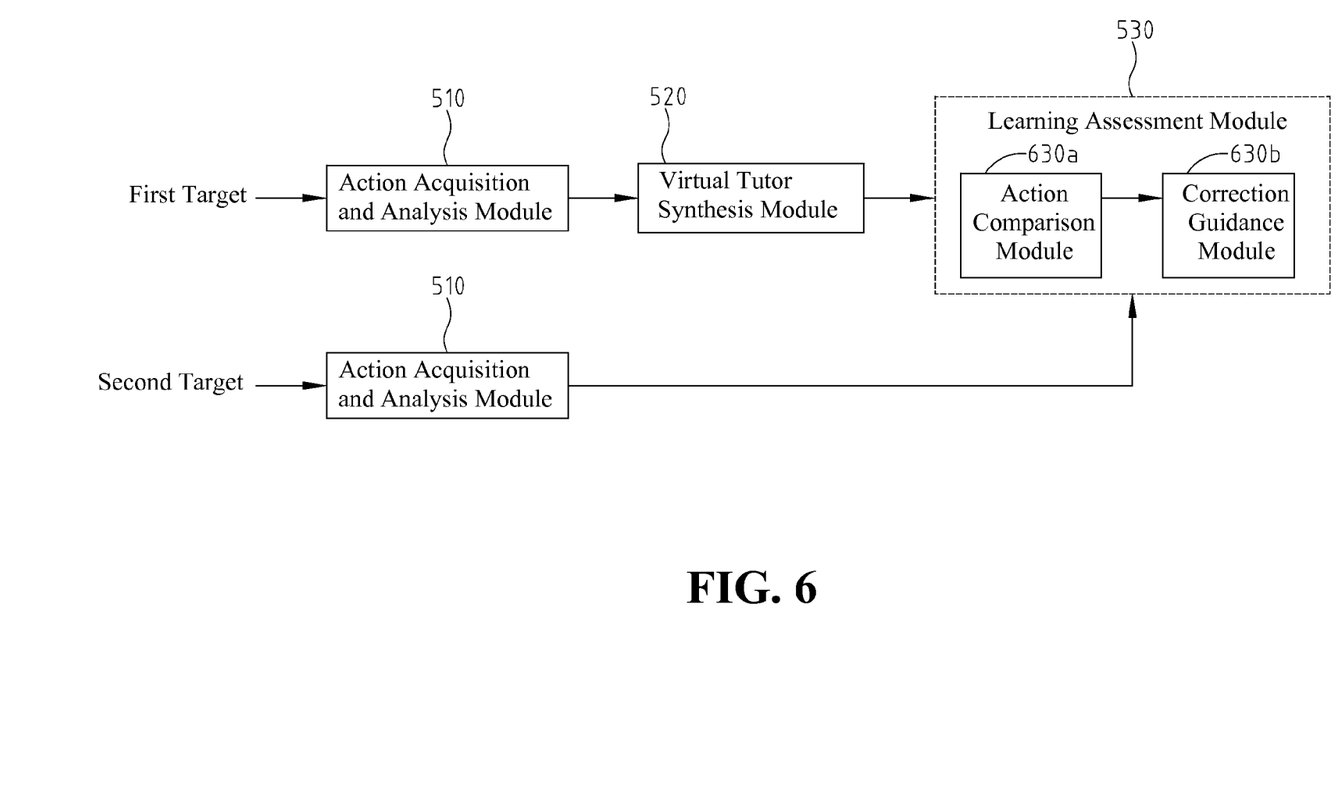
FIG. 6 shows an example of the learning assessment module including a comparison module and a correction guidance module.

Learning assessment module 530 further includes a comparison module and a correction guidance module. The comparison module generates related information on the difference between the virtual tutor and the second action-feature of the second target, and the correction guidance module provides correction guidelines based on the related information. As shown in FIG. 6, after virtual tutor is synthesized, learning assessment module 530 executes the action comparison 630a to generate related information on the difference between the second action-feature of the second target and the animated action-feature of virtual tutor. Based on the related information, a correction guideline is provided by the correction guidance module 630b.

Figure 7:
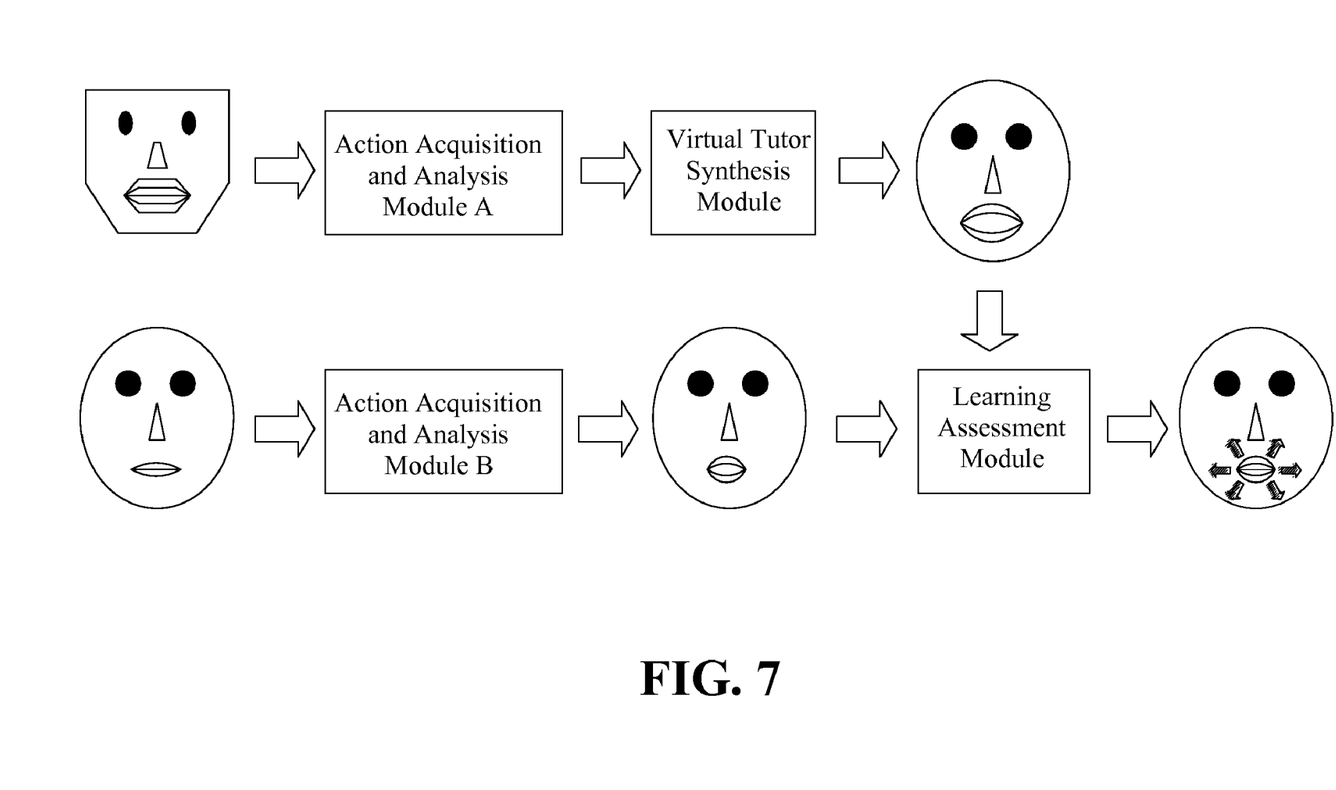
FIG. 7 shows an example of the image-based virtual tutor according to the present invention.

The following is the description of FIG. 7, where the virtual tutor is synthesized by applying the action-feature of the imitated target to the intrinsic model of the learner to show how the learner should behave, as well as for comparing with the actual action of the learner. FIG. 7 shows the learning on facial motion around the mouth region.

Figure 8:
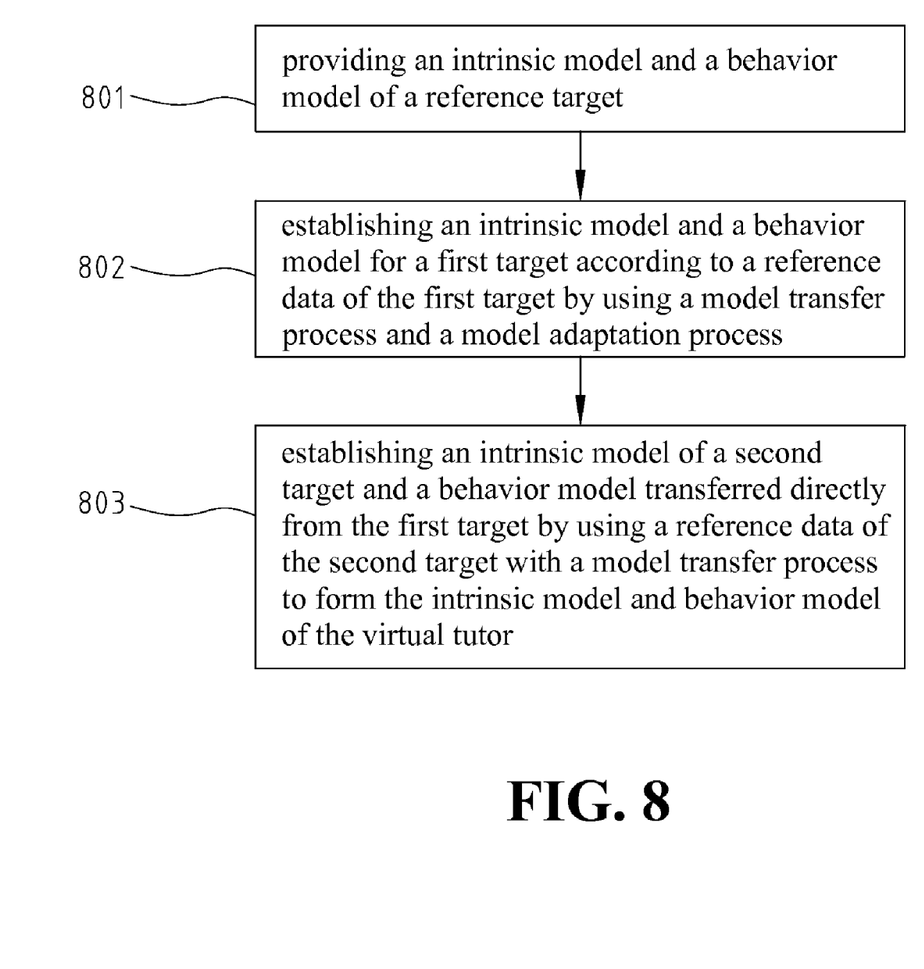
FIG. 8 shows a flowchart illustrating an example of the virtual tutor synthesis mechanism shown in FIG. 4.

The operation of the learning assessment method includes the virtual tutor synthesis operation and the operation after the virtual tutor synthesis. The virtual tutor synthesis module 520 includes a model transfer module and a model adaptation module. The operation of virtual tutor synthesis includes the following steps 801-803, as shown in FIG. 8.

Step 801 is to provide an intrinsic model and a behavior model of a reference target and an action-feature of a first target. In FIG. 8, a multidimensional morphable model (MMM) and phoneme models of the reference target can be established by using trainable videorealistic speech animation technique on sufficient audio and video corpus of the reference target. The MMM is the intrinsic model of the reference target, and the phoneme model is the behavior model of the reference target. The action-feature of the first target can be a small video corpus of the first target.

Step 802 is to apply model transfer and model adaptation to establish the intrinsic model and the behavior model of the first target according to the action-feature. In FIG. 8, the model transfer and model adaptation of the transferable video realistic speech animation technique can be used to establish the intrinsic model $MMM_T$ and behavior model $PM_T$, for the imitated target according to the small video corpus of the imitated target. The model transfer process uses a matching-by-synthesis approach to semi-automatically select new set of prototype images from the new video corpus that resemble the original prototype images based on the flow and texture matching for image synthesis. The second process is a model adaptation process using a gradient descent linear regression algorithm to adapt the MMM phoneme models so that the synthesized MMM trajectories can be closer to the speaking style of the novel target. The following describes the model transfer process and the model adaptation process in details.

A. Model Transfer

With a small video corpus from a novel target, there would not be enough data to retrain an entire MMM phoneme model. Therefore, one simple solution to model transfer is to choose a new set of prototype images from the image corpus, and then directly transfer the original phoneme model to the novel target. Since each dimension of the MMM parameters is associated with a specific prototype image obtained from the original video corpus, the newly selected prototype images have to exhibit similar flow and texture to the corresponding prototype images of the original target.

The matching-by-synthesis approach of the present invention first uses radial basis function (RBF) interpolation to establish dense point correspondence between the reference images of the original target and the novel target. Then, the matching is performed on the synthesized flows and textures with the small video corpus of the novel target.

I. Dense Point Correspondence

The RBF is an interpolation method widely used in computer graphics. The RBF-based interpolation method requires only a few correspondence points as controlling points to calculate the rather smooth correspondence for all other points. An example according to the present invention uses 38 prominent feature points around the mouth area as the controlling points, and manually marks the positions of these points in the reference images of the original target $Ref_A$ and the novel target $Ref_B$. With the RBF-based interpolation method, the dense correspondence between each point $p=(p_x, p_y)^T$ in $Ref_A$ and the corresponding point $S(p)$ in $Ref_B$ is formulated by a linear combination of radial basis function augmented with a low-order polynomial function:

$$S(p) = \sum_{k=1}^{N} \lambda_k \phi(\|p - p_k^a\|) + Q(p), \quad (6)$$

where Q(P) is a low-order polynomial function, and $$Q(p) = (c_{00} + c_{01}p_x + c_{02}p_y, c_{10} + c_{11}p_x + c_{12}p_y)^T, \quad (7)$$

subject to:

$$S(p_k^a) = p_k^b,$$

$$\sum_{k=1}^{N} \lambda_k [1 \quad p_{k,x}^a \quad p_{k,y}^a] = 0,$$

where $p_k^a$ and $p_k^b$ are the corresponding k-th feature points in $Ref_A$ and $Ref_B$, respectively, and $\phi(r)=\exp(-cr^2)$ is the radial basis function.

II. Flow and Texture Matching

The flow matching and texture matching are performed by finding a new set of prototype images in the small video corpus of the novel target that is most similar to the synthesized prototype flows and textures obtained with the dense point correspondence. Given a flow vector in $Ref_A$ started from point p and moved to $p'=p+C_A(p)$, the corresponding flow vector in $Ref_B$ will be started from position $S(p)$ and moved to $S(p')$, resulted in a synthetic flow vector $C_B^{syn}(S(p))$ $=S(p')-S(p)$. Hence, by calculating the differences between the synthetic flow in the mouth region with flow vectors of each image in the new video corpus, the best candidate can be found with the minimal flow difference:

$$P_k^* = \operatorname{argmin} \sum_i \sum_p w_f(p) \| C_{B,P_k}^{syn}(S(p)) - C_{B,i}(S(p)) \|, \quad (8)$$

where $w_f(.)$ is a weighting mask emphasizing the lip region, $C_{B,P_k}^{syn}$ is the synthetic flow for the k-th prototype image, and $C_{B,i}$ is the flow of the i-th image of the small video corpus of the novel target. Thereby, the best candidates obtained from flow matching form a set of the initial prototype images.

Then, the present invention utilizes the dependency among the prototype images to synthesize the texture of the prototype images for the following texture matching.

First, a prototype image can be formulated as a linear combination of the other prototype images in accordance with the non-orthogonal relation among the prototype images:

$$I_{A,P_k}^{syn} = \sum_{i,i \neq k} \beta_{i,k} I_{A,P_i \to P_k}^{warped} \quad (9)$$

$$= \sum_{i,i \neq k} \beta_{i,k} W_F(I_{A,P_i}, W_F(C_{A,P_k} - C_{A,P_i}, C_{A,P_i})),$$

subject to $$\beta_{i,k} \geq 0 \, \forall \, i \text{ and } \sum_{i,i \neq k} \beta_{i,k} = 1,$$

where the texture coordinates can be derived by minimizing the difference between the synthetic image $I_{A,P_k}^{syn}$ and the k-th prototype image $I_{A,P_k}$. One hypothesis of the present invention is that the synthetic prototype image of a novel target can be generated with the same texture coordinates as the corresponding prototype of the original target:

$$I_{B,P_k}^{syn} = \sum_{i,i \neq k} \beta_{i,k} I_{B,P_i \to P_k}^{warped} \quad (10)$$

$$= \sum_{i,i \neq k} \beta_{i,k} W_F(I_{B,P_i}, W_F(C_{B,P_k}^{syn} - C_{B,P_i}, C_{B,P_i})),$$

where $I_{B,P_i}$ is the texture of the i-th prototype image of the novel target selected by flow matching, and $I_{B,P_k}^{syn}$ is the k-th synthetic texture. Similarly, the texture matching can be performed by calculating the differences between the synthetic texture with texture of each image in the new video corpus:

$$P_k^{**} = \operatorname{argmin} \sum_i \sum_p w_t(p) \| I_{B,P_k}^{syn}(p) - I_{B,i}(p) \|, \quad (11)$$

where $w_t(.)$ is a weighting mask emphasizing the mouth region, and $I_{B,i}$ is the texture of the i-th image of the small video corpus of the novel target. It is worth noticing that the change of one candidate prototype image may affect the texture synthesis of other prototype textures. Therefore, iterative updating must be performed for equations (10) and (11) until the result converges or a specific number of iterations are executed.

B. Model Adaptation:

After the model transfer, the synthesized speech animation can be directly conducted. However, the synthesized speech animation is animated with the novel target's face, but actually behaves with the speaking style of the original target. Therefore, the present invention adopts the user adaptation concept of the maximum likelihood linear regression method (MLLR) widely used in the speech recognition to propose gradient descent linear regression method for the phoneme model adaptation from the small video corpus, such that the synthesized animation can be more similar to the speaking style of the novel target.

The hypothesis of the linear regression is that a linear relation exists between the adapted model and the original model. Also, multiple components in the model can share a common linear transformation to resolve the problem of insufficient adaptation data. According to the characteristics of phonemes in the MMM space, the present invention divides all phonemes in the MMM parameter space into a plurality of regression groups. Each group uses a common linear transformation matrix $R_g$ to transform the mean vector $\mu_p$ of any phoneme p of this group to $\mu_p^{adapt} = R_g \xi_p$, where $\xi_p = [1 \mu_p]^T$ is the extended mean vector. The modified objective function is:

$$E_s = (y - R\xi)^T D^T \Sigma^{-1} D(y - R\xi) + \lambda y^T W_k^T W_k y, \quad (12)$$

where y is the synthesized MMM parameters, $\xi$ is the cascaded extended mean vector, and R is the sparsely cascaded regression matrix. After the optimization, the optimal synthesized MMM parameters can be derived from the following equation:

$$(D^T \Sigma^{-1} D + \lambda W_k^T W_k) y = D^T \Sigma^{-1} DR\xi. \quad (13)$$

Instead of adapting the mean and the covariance of each phoneme model as in equation (5), the regression matrix for each regression group g is adapted by gradient descent learning. With the objective function $E_a = (z-y)^T(z-y)$, the gradient between $E_a$ and the regression matrix $R_g$ can be derived by chain rule:

$$\frac{\partial E_a}{\partial R_g} = \left(\frac{\partial E_a}{\partial y}\right)^T \left(\frac{\partial y}{\partial R_g}\right)$$

$$\text{where } \frac{\partial E_a}{\partial y} = -2(z - y),$$

and $\partial y / \partial R_g$ can be obtained by the following equation derived from equation (13):

$$\left(D^T \sum^{-1} D + \lambda W_k^T W_k\right) \frac{\partial y}{\partial R_g} = D^T \sum^{-1} D \frac{\partial R}{\partial R_g} \xi. \quad (14)$$

Then, each regression matrix is updated with the computed gradient by the following equation:

$$R_g^{new} = R_g^{old} - \eta \frac{\partial E_a}{\partial R_g}, \quad (15)$$

where $\eta$ is the learning rate parameter.

Step 803 is to construct the intrinsic model and the behavior model of the virtual tutor by using the intrinsic model and behavior model of the first target as the basis to perform a model transfer process. In FIG. 7, the intrinsic model $MMM_T$ and behavior model $PM_T$ of the imitated target are the basis for the model transfer process to transfer the behavior model $PM_T$ to the learner's intrinsic model $MMM_L'$ established with the learner's video corpus to form the intrinsic model and the behavior model of the virtual tutor.

It is worth noticing that three different video corpuses are collected in the above steps. The first is a complete video corpus of the reference target, while the second and the third is a small video corpus of the first and the second targets. With model transfer and model adaptation techniques, the intrinsic model and behavior model of the first target is established. With a further model transfer process, the intrinsic model of the second target is established and the behavior model of the first target is transferred to the second target to form the intrinsic and behavior models of the virtual tutor.

The following describes the remaining steps of the process of FIG. 8 after the virtual tutor synthesis.

First, given a sequence of speech video $IMG_T$ of the imitated target, the action acquisition and analysis module A generates the time sequence of the phoneme of the speech and the action-feature $ACT_T$, the virtual tutor synthesis module can either (1) utilize the behavior model $PM_T$ and the intrinsic model $MMM_L'$ of the virtual tutor according to the phoneme sequence, or (2) apply the action-feature $ACT_T$ to the intrinsic model $MMM_L'$ of the virtual tutor to generate synthesized image sequence $IMG_{VC}$ with the action-feature $ACT_{VC}$, which are similar to the speaking style of the imitated target.

Then, the mimicking behavior of the learner is acquired and analyzed by action acquisition and analysis module B to obtain the speech image sequence $IMG_L$ of the learner and the action-feature $ACT_L$.

Finally, the learning assessment module uses the image and action comparison mechanism to calculate the difference of each corresponding pixel of $IMG_{VC}$ and $IMG_L$, and the action difference between the corresponding pixel of $ACT_{VC}$ and $ACT_L$. To provide clear correction guideline to the learner, the mouth region can be further divided into a few sub-regions with each sub-region having an arrow whose direction and the length represent the direction and the amplitude of the correction.

According to the structure disclosed in the present invention, other embodiments can include the use of the motion capture devices to extract the action parameters from interested region the imitated target, and use these parameters to drive the synthesized virtual tutor to exhibit the imitated action. At the same time, the learner's action is captured for comparison to provide correction guidelines for the learner. Another embodiment may construct the virtual tutor with the intrinsic model of the imitated target to exhibit the synthesized action similar to the action of the learner, and compare the difference between the two actions to provide correction guidelines. Yet another embodiment can use the learner's acoustic timbre model to exhibit the intonation of the imitated target as the virtual tutor for speech learning assessment.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method using a synthesized virtual tutor in a learning assessment device for providing performance assessment of a subject performing an action imitation task, comprising the steps of:

using at least a video action acquisition and analysis module to acquire a first action video of a first target for analyzing a first action-feature of said first target performing a first action;

using said at least a video action acquisition and analysis module to acquire a second action video of a second target for analyzing a second action-feature of said second target performing a second action imitating said first action;

establishing an intrinsic model of said second target by using reference data of said second target, said intrinsic model being constructed with a multidimensional morphable model by using image textures and motion flows of said second target;

generating a synthetic video with a virtual tutor having said image textures and motion flows of said second target but exhibiting a synthesized action-feature with behavior similar to said first action-feature based on a behavior model of said first target, said behavior model being constructed by using a set of reference data of said first target with a model transfer process and a model adaptation process, said model transfer process being composed of image texture matching and motion flow matching procedures for finding a set of prototype images for said first target with a matching-by-synthesis approach; and assessing image texture and motion flow differences between said second action-feature and said synthesized action-feature through a learning assessment module;

wherein said image textures and motion flows of said second target are trained from a set of prototype images selected from said reference data of said second target with said multidimensional morphable model, and said synthetic video with said virtual tutor is generated by compositing said image textures and motion flows of said second target using said intrinsic model of said second target to form each frame of said synthetic video by warping and combining said prototype images with parameters generated according to said behavior model of said first target; and wherein said model transfer process adopts said matching-by-synthesis approach further comprising the steps of:

establishing a set of key correspondences between a reference image of said first target and a reference image of said second target to derive dense point correspondences as an image warping function between said first and second targets;

generating a set of synthetic prototype motion flows for said first target by warping motion flows of said prototype images of said second target with said image warping function, and searching for an initial set of prototype images from said reference data of said first target whose motion flows are best matched to said synthetic prototype motion flows;

generating a set of synthetic prototype image textures by warping and combining said initial set of prototype images using linear dependency between said prototype images of said second target; and iteratively searching for an updated set of prototype images from said reference data of said first target whose image textures and motion flows are best matched to said synthetic prototype image textures and motion flows, and taking said updated set prototype images as said set of prototype images for said first target.

2. The method as claimed in claim 1, wherein said first target is a learner and said second target is a target being imitated.

3. The method as claimed in claim 1, wherein said first target is a target being imitated and said second target is a learner.

4. The method as claimed in claim 1, wherein said performance assessment includes the comparison of said second action-feature and said synthesized action-feature of said virtual tutor based on differences in image textures and motion flows, and the provision of a corresponding assessment result or correction guidelines.

5. The method as claimed as in claim 1, wherein said synthetic video with said virtual tutor is generated with the steps of:
providing said intrinsic model and a behavior model of said second target trained with a sufficient amount of said reference data of said second target;
establishing an intrinsic model of said first target and said behavior model of said first target according to said set of reference data of said first target by using said model transfer process and said model adaptation process with said intrinsic model of said second target and said behavior model of said second target;
using said intrinsic model of said second target to form the intrinsic model of said virtual tutor;
using said behavior model of said first target to form the behavior model of said virtual tutor; and
generating image texture and motion flow parameters based on said behavior model of said virtual tutor and synthesizing images with said intrinsic model of said virtual tutor to form a synthetic video.

6. The method as claimed as in claim 5, wherein said model adaptation process adopts a gradient descent linear regression method to build an adapted behavior model for said first target by adapting an original behavior model of said second target and calculating linear transformation relation between said adapted behavior model of said first target and said original behavior model of said second target to minimize differences in image textures and motion flows generated by said adapted behavior model with respect to said reference data of said first target, said linear transformation being adapted iteratively by using a gradient descent approach that updates said linear transformation with partial derivatives of said differences with respect to parameters of said linear transformation.

7. The method as claimed in claim 6, wherein said gradient descent linear regression method includes the following steps to calculate linear transformation relation between said adapted behavior model of said first target and said original behavior model of said second target:
dividing a plurality of elements in said original behavior model into a plurality of regression groups, each said group g sharing a common linear transformation matrix $R_g$ to transform a mean vector $\mu_p$ of any element p of the group g to $\mu_p^{adapt}=R_g\xi_p$, where $\epsilon_p=[1\ \mu_p]^T$ is an extended mean vector; and
adapting said linear transformation matrix $R_g$ to minimize synthesis error in terms of differences in image textures and motion flows generated by said adapted behavior model with respect to said reference data of said first target for elements in said group g.

8. The method as claimed in claim 7, wherein said dividing said plurality of elements into said plurality of groups is based on the characteristics of said elements in a multidimensional morphable model parameter space.

9. A device using a synthesized virtual tutor for providing performance assessment of a subject performing an action imitation task, comprising:
at least a video action acquisition and analysis module for acquiring a first action video of a first target and analyzing a first action-feature of said first target performing a first action, and acquiring a second action video of a second target and analyzing a second action-feature of said second target performing a second action imitating said first action;
a virtual tutor synthesis module for generating a synthetic video with a virtual tutor having image textures and motion flows of said second target but exhibiting a synthesized action-feature with behavior similar to said first action-feature based on a behavior model of said first target, said behavior model being constructed by using a set of reference data of said first target with a model transfer process and a model adaptation process, said model transfer process being composed of image texture matching and motion flow matching procedures for finding a set of prototype images for said first target with a matching-by-synthesis approach; and
a learning assessment module for assessing image texture and motion flow differences between said second action-feature and said synthesized action-feature;
wherein said image textures and motion flows of said second target are trained from a set of prototype images selected from said reference data of said second target with said multidimensional morphable model, and said synthetic video with said virtual tutor is generated by compositing said image textures and motion flows of said second target using said intrinsic model of said second target to form each frame of said synthetic video by warping and linearly combining said prototype images with parameters generated according to said behavior model of said first target; and
wherein said model transfer module adopts said matching-by-synthesis approach through comprising the steps of:
establishing a set of key correspondences between a reference image of said first target and a reference image of said second target to derive dense point correspondences as an image warping function between said first and second targets;
generating a set of synthetic prototype motion flows for said first target by warping motion flows of said prototype images of said second target with said image warping function, and searching for an initial set of prototype images from said reference data of said first target whose motion flows are best matched to said synthetic prototype motion flows;
generating a set of synthetic prototype image textures by warping and combining said initial set of prototype images using linear dependency between said prototype images of said second target; and
iteratively searching for an updated set of prototype images from said reference data of said first target whose image textures and motion flows are best matched to said synthetic prototype image textures and motion flows, and taking said updated set prototype images as said set of prototype images for said first target.

10. The device as claimed in claim 9, wherein said learning assessment module further includes a comparison module and a correction guidance module, said comparison module generates related information on differences in image textures and motion flows between said second action video and said synthetic video with said virtual tutor, and said correction guidance module provides guidelines in accordance with said related information.

11. The device as claimed in claim 9, wherein said model adaptation module adopts a gradient descent linear regression method to build an adapted behavior model for said first target by adapting an original behavior model of said second target and calculate linear transformation relation between said adapted behavior model and said original behavior model of said second target to minimize differences in image textures and motion flows generated by said adapted behavior model with respect to said reference data of said first target, said linear transformation being adapted iteratively by using a gradient descent approach that updates said linear transformation with partial derivatives of said differences with respect to parameters of said linear transformation.

* * * * *